Aug. 14, 1962

N. C. BREMER 3,049,583

MAGNETIC RECORDING MEANS

Filed Dec. 30, 1959

INVENTOR
NORMAN C. BREMER

BY Samuel J. Stoll
ATTORNEY.

United States Patent Office 3,049,583

Patented Aug. 14, 1962

3,049,583

MAGNETIC RECORDING MEANS

Norman C. Bremer, Box 491, Ithaca, N.Y.

Filed Dec. 30, 1959, Ser. No. 862,972
3 Claims. (Cl. 179—100.2)

Figure 1:
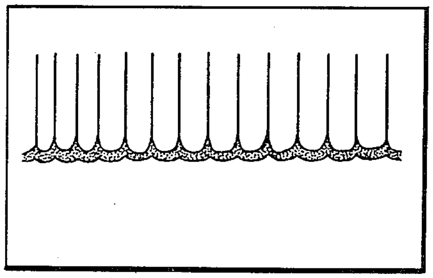

This invention relates to magnetic recording means and methods and more particularly to means and methods for accurately locating the angle of a magnetic head with respect to a multiple track magnetic tape.

With the advent of stereophonic sound it has been found that conventional alignment techniques are not sufficient.

In the recording of voice, music or information on magnetic tape, the tape is passed at one of several standard speeds over the recording "head." The head consists of a magnetic path excited by a coil which surrounds a closed U core. The magnetic path is complete except for a separation of about 1/100,000 of an inch. This separation is called the "gap."

The gap extends across the portion of the tape which is to be recorded. The magnetic flux created by the electrical impulses fed to the head from the amplifiers passes partially through the magnetic coating of the tape and permanently magnetizes it.

In the reproducing of "playback" function of the recorder, the playback head, which is similar to the record head, acts as an electromagnetic generator and the minute variations in flux density caused by the motion of the tape set up an alternating current in the head winding, which, when amplified, reproduces the signal originally impressed upon the tape by the "record" head.

To properly reproduce the high frequencies in the signal, it is extremely important that the playback head occupy the same angular relationship to the longitudinal axis of the tape that the "record" head occupied at the time of recording.

In the interests of standardization, the tape recording industry has standardized upon an angular relationship of gap to tape edge or axis of exactly 90°. This relationship is called the "azimuth."

The usual method of standardizing—or of setting the azimuth of the gap of the playback head with respect to the transport guides of the recorder is to "play" a standard azimuth alignment tape.

A standard alignment tape has recorded upon it a high frequency tone, usually 10,000 or 15,000 cycles per second. Precise optical instruments or other means are employed to determine the angular relationship of the magnetically oriented signal lines on the standard tape and to correct the recording mechanism which produces it so that the lines are exactly perpendicular to the tape edges.

To adjust a recorder's azimuth, the standard tape is played upon it and the voltage of the signal generated is measured. The playback head is now adjusted in angular relationship to the line of tape travel until the highest voltage is obtained, at which time the playback head will occupy the correct, standard azimuth setting.

The recording head is now adjusted by putting a blank tape into the recorder and impressing upon it a high frequency tone, at the same time picking this signal up on the previously accurately aligned playback head and measuring the voltage generated. This is possible because on most recorders the playback head follows the record head with respect to tape travel, the two heads being side by side. The "record" head is now adjusted until the highest reading is obtained on the meter.

The technique just described for azimuth standardization is fully satisfactory for equipment on which the full width of the tape is utilized for the signal being recorded, and this invention will in no way improve upon the above method nor any other method of azimuth standardization of recorders on which the gaps of the "heads" extend across the wull width of the tape and/or contain but one coil in the head for signal pick-up.

In the recording of or in the reproduction of stereophonic sound or music, two or more electromagnetic elements are built into one head. Each separate element of the stereophonic head records and plays a separate channel. While two, three, four and sometimes as many as thirty channels are incorporated into one head, for the purposes of explaining this invention we will deal with the type of stereophonic head which has two elements, or in other words, contains two separate magnetic cores containing the previously described "gaps," and two separate windings or coils.

The terminals of these coils are connected to suitable amplifying systems and the output of these amplifiers terminate in loud speakers or the like.

These two-channel stereophonic heads are presently made in two types; one to record and play back two-track tape, another to record and reproduce four-track tape.

Inasmuch as this invention is especially useful for use on this latter four track type of equipment, we will dwell on this in some detail.

While the heads for use with four-track tape contain but two elements, the tape when fully recorded will contain four "tracks" of information. The elements in the head are spaced two tracks apart, and when the tape is played in the forward direction of travel tracks one and three are in contact with the head elements. When the tape is played in the reverse direction, tracks two and four are in register with the head elements.

In either the case of two-track tape or four-track tape, it will be appreciated that the width of the active "gaps" in the head elements is considerably narrower than the full width of the tape. For instance, half-track tape gap width is .110"—quarter-track gap width is but .043" or 17% of the tape width of .250".

To return to "azimuth" setting of the head, it is apparent that a loss in high frequency response in either recording or reproducing would result if either function were performed on equipment which did not have a standard azimuth setting; the base for comparison of course being the opposite function on equipment which did have a standard azimuth.

This loss in high frequency response is due to the fact that when the tape magnetic orientation pattern is "skewed" with relation to the "gap" of the head, the signal "peaks" do not meet the almost microscopic gap at exactly the same instance, and in the case of high frequencies, the wavelength of which is often less than 1/1000 inch, a skewing of less than one degree will cause almost complete cancellation of the signal.

It will be realized that a given amount of angular displacement or "skew" for a certain high frequency tone will result in less signal loss on a narrow head than it would on a wide head.

Using this reasoning, it can now be said that a high frequency tone, used for the purpose of azimuth standardization, loses its effectiveness in a ratio about directly proportionate to the effective width of the head "gap."

In other words, then, a 10,000 cycle azimuth standardizing tape used on a "quarter-track" head is 17% as sensitive or effective as it would be on a full track head. To repeat the statement, ". . . a given amount of angular displacement or 'skew' for a certain high frequency tone will result in less signal loss on a narrow head than it would on a wide head."

This would seem to mean that azimuth accuracy is less important when using narrow heads (or gaps) than when using a head with a wide gap.

This, however, is not quite the case with stereophonic heads and this will be explained.

Of substantially equal importance to the azimuth accuracy of each head element in a stereophonic head is the "phasing" of the two (or more) elements.

It is common practice in the manufacture of stereophonic heads to grind or lap the pole pieces of the cores of the elements, so that when assembled, the "gaps" of the two (or more) elements have a high degree of co-linearity one with the other. If, then, the head is adjusted in the recorder at correct azimuth, and a signal is impressed upon the two head elements with equal amplitude in each, the peak of any particular wave in this signal will be recorded upon the tape on an imaginary line which is exactly perpendicular to the longitudinal axis of the tape.

When reproduced upon equipment having accurate azimuth adjustment, the peak of the aforementioned wave will produce a pulse in one of the loud speakers of one channel exactly coinciding with a pulse of similar polarity in the other loud speaker.

This quality of phase coordination is of great importance in the recording and reproduction of music stereophonically where the character of the sound is of a transient nature and because of its point of origin could be heard in both loud speakers simultaneously. Such sounds are often produced by percussion instruments.

This invention is the process of using the combination of a tape containing a recording of a novel spike-pulse signal and a means of signal cancellation indication which permits of positive, accurate and simple alignment of both azimuth and channel phasing of stereophonic playback heads.

Accordingly, a principal object of the invention is to provide new and improved means and methods for aligning magnetic heads.

Another object of the invention is to provide new and improved means and methods of aligning recording and playback heads with respect to a multiple track magnetic tape.

Another object of the invention is to provide new and improved means and methods of aligning recording and playback heads with respect to stereophonic magnetic tape.

Another object of the invention is to provide means and methods to align magnetic heads with respect to multiple track magnetic tape comprising a magnetic tape having plurality of pulses on each of two tracks whereby when said head is properly aligned said pulse outputs will cancel.

Another object of the invention is to provide a new and improved method for aligning magnetic heads with respect to multiple track magnetic tapes.

Figure 2:
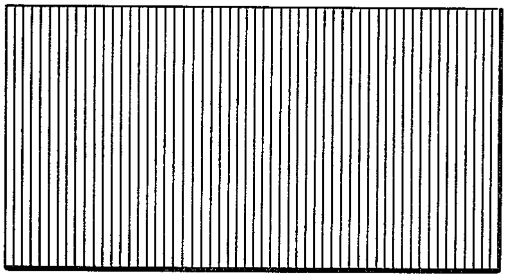
Figure 3:
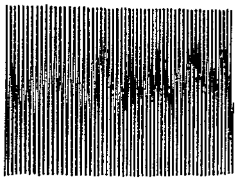
Figure 4:
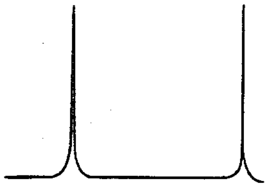
Figure 5:
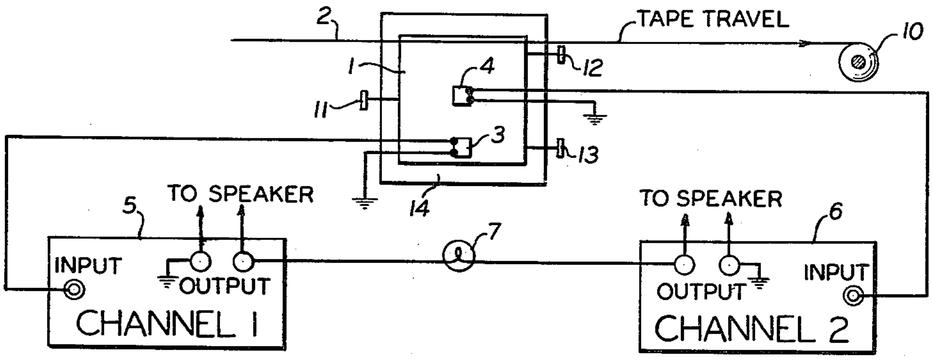
Figure 6A:
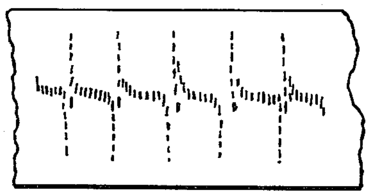
Figure 6B:
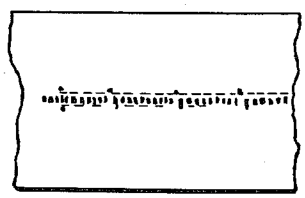

These and other objects of the invention will be apparent from the following specification and drawings of which FIG. 1 is a diagram illustrating the pulses used in the present invention, FIG. 2 is a representation of a section of tape upon which the pulses of FIG. 1 are recorded, FIG. 3 is a representation of a magnetic tape section upon which a conventional sine wave is recorded, FIG. 4 is a representation of the pulses of the present invention in the same scale as FIG. 3, FIG. 5 shows a block diagram illustrating the operation and method of the present invention, FIG. 6A is a representation of the pulses of the present invention when the head is not properly aligned, FIG. 6B shows a representation of the same pulses when the head is properly aligned.

Referring to the drawings, FIG. 1 shows typical pulses as used in the present invention as they would appear on an oscilloscope. The pulses are D.C. pulses and the pulse rate is approximately 1,000 pulses per second.

FIG. 2 shows a representation of a section of tape on which the pulses of FIG. 1 are recorded. The pulses show as straight magnetic lines on the tape. The magnetic lines on a tape may be photographed after treating the tape with a suspension of carbonyl iron and drying the tape.

FIG. 3 illustrates the prior system of recording a tone on the tape. The figure is a representation of a 10,000 cycle per second tone, as it would appear on an oscilloscope, and FIG. 4 shows a similar representation of the pulses of the present invention to the same scale. Note that the rise and fall time of the pulse in my signal is substantially the same or even more abrupt than each half wave of the 10,000 cycle tone, yet the spacing is approximately 10 times further apart.

FIG. 5 illustrates the means and methods of operation for aligning the play back or pick-up head in azimuth, i.e., its angular relation to the tape 2 upon which the pulses of the present invention have been recorded. The head 1 has two pick-ups 3 and 4. Angular adjustment means are provided which may be a plurality of adjustment screws 11, 12 and 13 mounted in the frame 14 and which support the head. A pair of amplifiers 5 and 6 are connected, one to each pick-up 3 and 4, and an indicating means such as a lamp 7 or volt meter is connected to the two amplifiers in a manner so that like signals from each amplifier will cancel each other.

The standard tape having the pulses of the present invention is threaded into the playback head 1 and the tape operated at its normal speed by driven spool 10. If the head is not properly aligned there will be an output which will energize he lamp or indicator 7, in which case the adjustment screws or other equivalent angular adjusting means are adjusted until the indication in the indicator 7 has minimized. When the head is properly aligned there will be a substantially complete cancellation and therefore no light in the lamp 7 or no indication in a meter. Due to the shape of the pulses as the head is adjusted into the proper position there will be a sharp dip in the meter or in the light of the indicator.

Assuming that the gaps of the recorder's head elements are not in exact alignment and as the tape passes over the head the magnetic "line" representing a spike pulse does not meet the gaps of the two head elements at exactly the same instant; and assuming further that the pulse meets the gap which feeds channel 1 amplifier first, then a fraction of a second later meets the gap of channel 2 amplifier, then an alternating current will flow through the lamp and the lamp will glow; provided of course that the tape remains in motion and the above sequence is repeated at the aforementioned pulse repetition rate of 1,000 per second.

It will be appreciated that the above condition of misalignment could be reversed; that is, the head could be slightly skewed in the other direction so that the spike pulse meets channel 2 gap before it meets channel 1 gap and the lamp would still receive an alternating current and be lighted.

If, however, the head is accurately aligned, the magnetic "line" on the tape representing the spike pulse will meet the gaps for each channel at exactly the same instant and the amplified pulse from one channel will be cancelled by the pulse (in the opposite direction) from the other channel.

Under the above condition, no current will flow through the lamp. Under this condition the head elements of the recorder are in precisely accurate phase relationship one with the other and if we concede (*a*) that the gaps in any one head are co-linear and (*b*) that the spike pulses were recorded with accurate perpendicularity to the tape edge—the head gaps of the recorder will also be accurately aligned as to azimuth relationship.

In the experimental work on this invention, and in dozens of tests on typical stereophonic recording and playback equipment of various types, it has been found that this method of alignment is much more sensitive than any other method. The sudden drop in brightness of the indicating lamp, or the drastic "dip" of an output meter if such is used will indicate the correct azimuth setting of a "quarter-track" head with a "positiveness" completely lacking in conventional methods.

One might be expected to ask—"why is the 'spike' pulse signal necessary—why cannot a regular high frequency alignment tape be used on a sterophonic equipment with the same cancellation technique that you have described for phase alignment indication?"

The answer to this will be readily apparent if we again refer to FIG. 2 and try to imagine twenty times as many "lines" of magnetism on the tape as there are on this photograph. This would be the number of lines that would be present on a 10,000 cycle per second alignment tape if photographed to the same degree of magnification.

In trying to find the point of phase alignment we would discover that we would have three, sometimes five positions of angular positions of the head where our lamp would dim or the VU meter dip, and at least three of these indications would be so nearly alike that it would be impossible to determine the correct phase and azimuth point. This is simply because in skewing the head through the adjustment range, we find points where the positive peak of one wave of our 10,000 cycle tone excites one head element and its corresponding channel and at the same instant the other channel is excited from a positive wave peak from the adjacent wave or possibly the second or third wave, any one of these causing signal cancellation practically to the same degree as the correct one.

By using a very narrow pulse, we are able to obtain the same or better indication of correct alignment as with a high frequency tone, and by spacing the pulses widely apart, eliminate the danger of obtaining a false indication of phasing and alignment.

While we have dealt in our discussion extensively with the application of the technique on "quarter-track" head equipment, it is also much more effective than conventional alignment methods for alignment and phasing of "half-track" stereophonic recording and playback equipment.

The use of points separated by the space between tape channels rather than points separated by the width of one track for ordinates for establishing perpendicularity sharply accentuates the possibilities for accuracy. Added to this is the great increase in sensitivity derived from the voltage cancellation principle which has been described.

I claim:

1. Means for alignment of a multi-track stereophonic magnetic tape head comprising a magnetic tape having recorded on it on each of two separated tracks a plurality of direct current spike pulses occurring regularly, the time spacing of said pulses being many times greater than the duration of said pulses, a plurality of pickup means in said head one for each of said tracks, a pair of amplifiers each connected to one of said pickup means, and indicator means connected to said amplifiers to measure the difference of said amplifier outputs.

2. The method of aligning a multi-track stereophonic head for magnetic tapes comprising, recording a series of direct current spike pulses on each of two tracks on a magnetic tape with a recording head having standard alignment, feeding said tape into the multi-track head to be recorded, measuring the difference output of said pulses on said two tracks, and adjusting the alignment of said pickup head to reduce said difference output to a minimum.

3. The method of aligning a multi-track sterophonic head for magnetic tapes comprising the steps of feeding a standard tape into said head said tape having recorded on it a series of pulses on each of two tracks said pulses having been recorded by a head with standard alignment and measuring the difference output of said pulses on said two tracks, and adjusting the alignment of said pickup head to reduce said difference output to a minimum.

References Cited in the file of this patent

UNITED STATES PATENTS

| | | |
|---|---|---|
| 2,709,204 | Holmes | May 24, 1955 |
| 2,751,439 | Burton | June 19, 1956 |
| 2,922,106 | Oates et al. | Jan. 19, 1960 |
| 2,937,239 | Garber et al. | May 17, 1960 |
| 2,937,366 | Sims | May 17, 1960 |